(12) United States Patent
Flieswasser et al.

(10) Patent No.: US 7,372,459 B2
(45) Date of Patent: May 13, 2008

(54) METHOD FOR STORING LAYERS' INFORMATION OF A LAYERS-MADE OBJECT

(75) Inventors: Roni Flieswasser, Neise (IL); Moti Yanuka, Haifa (IL); Evgenia Chernomaz, Haifa (IL); Yossi Pinhassi, Hamovil (IL); Daniel Buzaglo, Yokneam (IL)

(73) Assignee: Camtek Ltd

( * ) Notice: Subject to any disclaimer, the term of this patent is extended or adjusted under 35 U.S.C. 154(b) by 296 days.

(21) Appl. No.: 10/508,527

(22) PCT Filed: Mar. 17, 2003

(86) PCT No.: PCT/IL03/00226

§ 371 (c)(1),
(2), (4) Date: Jul. 25, 2005

(87) PCT Pub. No.: WO03/081535

PCT Pub. Date: Oct. 2, 2003

(65) Prior Publication Data

US 2006/0013471 A1    Jan. 19, 2006

(30) Foreign Application Priority Data

Mar. 21, 2002   (IL) .................................. 148829

(51) Int. Cl.
*G06T 15/00* (2006.01)
(52) U.S. Cl. .................. 345/419; 345/424; 382/154; 382/294
(58) Field of Classification Search ........ 345/419, 345/424; 382/154, 294
See application file for complete search history.

(56) References Cited

U.S. PATENT DOCUMENTS 4,961,154 A    10/1990    Pomerantz et al.

(Continued)

OTHER PUBLICATIONS

Minatel et al; "Three-dimensional reconstruction and visualization of tomographic images system using frequential techniques and wavelets"; Computer Graphics, Image Processing, and Vision, 1998. Proceedings, SIBGRAPI '98, International Symposium on Rio de Janeiro, Brazil, Oct. 20-23, 1998, Los Alamitos, CA, USA, IEEE Comuter Society, US; Oct. 20, 1998, pp. 38-45, XP010309817.

(Continued)

*Primary Examiner*—Kimbinh T. Nguyen
(74) *Attorney, Agent, or Firm*—Oren Reches; Reches Patents

(57) ABSTRACT

A method for storing and displaying a layers' information of a layer-made object, comprising: (a) forming a layer-image of each layer of said object layers, wherein said layer image is a real perpendicular view image of said layer; (b) aligning each of said layer-images in a common two-dimensions axis, wherein said layer-image location in said common axis is in correspondence with the location of said layer in said object when is assembled; (c) forming two dimension matrixes, a two dimension matrix for each layer-image, wherein each matrix element has three variables (x,y,j)—when "x" and "y" are representing a point location on said layer-image according to said common axis and "j" represents an appearance of material view in said point of said layer-image; and (d) adding said two dimension matrixes into a three-dimensions matrix, wherein each matrix element has four variables (x,y,z,j)—when "x" and "y" are representing said point location, "z" represents layer identification and "j" represents said appearance of material.

12 Claims, 2 Drawing Sheets

A     B

U.S. PATENT DOCUMENTS 7,133,041 B2 * 11/2006 Kaufman et al. .......... 345/419
2001/0028732 A1 10/2001 Coulombe et al.

OTHER PUBLICATIONS

Minatel E R et al: "Three-dimensional Reconstruction and visualization of tomographic images system using frequential techniques and wavelets" Computer Graphics, Image Processing, and Vision, 1998. Proceedings. SIBGRAPI '98. International Symposium on Rio de Janeiro, Brazil Oct. 20-23, 1998, Los Alamitos, CA, USA,IEEE Comput. Soc, US, Oct. 20, 1998, pp. 38-45, XP010309817 ISBN: 0-8186-9215-4.

* cited by examiner

METHOD FOR STORING LAYERS' INFORMATION OF A LAYERS-MADE OBJECT

FIELD OF THE INVENTION

The present invention relates to store and display product information when the product is made of layer, e.g. PCB or wafer. The present invention relates to a method that is useful in automatic optical inspection.

BACKGROUND OF THE INVENTION

Varieties of products are made of layers. Actually, in a perpendicular view—almost every product is made of layers, which is built one on the other. From the aspect of production, "layer" not necessarily meant a physical layer and a layer could be a process layer, such "drilling", "painting" or any other process or sequence of processes.

To store and display product's layers, a draw or a CAD/CAM for each layer is stored and is displayed separately or on a transparent background drawing. All these methods are inconvenient and can be use in a small number of layers.

Semiconductor wafers and PCB are made of layers and layers information is very useful for final inspection. A PCB, for example, made from large number of layers, but in the final product only the top layer is viewed while the others are hidden. The information about all layers of an inspected PCB in a given point is usefull to decide how to treat a defect in that given point.

It would be advantageous to have a new method, which enables to store as a coded and display in one image, the whole information layers of a product or object.

SUMMARY OF THE INVENTION

The present invention is a method for storing and displaying a layers' information of a layer-made object.

According to the teachings of the present invention there is provided a method for storing and displaying a layers' information of a layer-made object that includes the following steps:
  forming a layer-image of each layer of the object layers, wherein the layer image is a real perpendicular view image of the layer;
  aligning each of the layer-images in a common two-dimensions axis, wherein the layer-image location in the common axis is in correspondence with the location of the layer in the object when is assembled;
  forming two dimension matrixes, a two dimension matrix for each layer-image, wherein each matrix element has three variables (x, y, j)—when "x" and "y" are representing a point location on the layer-image according to the common axis and "j" represents an appearance of material view in the point of the layer-image; and
  adding the two dimension matrixes into a three-dimensions matrix, wherein each matrix element has four variables (x, y, z, j)—when "x" and "y" are representing the point location, "z" represents layer identification and "j" represents the appearance of material.

By another aspect of the present invention, it is provided the method for storing and displaying a layers' information, further includes:
  representing each element of the three-dimensions matrix as a function (x, y, j[i]), wherein Jxy=F (x, y) represents information at location x, y in the common axis, where Jxy=(jxy1, jxy2, jxy3, . . . jxyn), which is an "n" number length vector wherein "n" is the number of the layers and jxy[i] is a data according to the i-th layer out of "n" layers at the location (x, y).

By another aspect of the present invention, it is provided the method for storing and displaying a layers' information, further includes:
  storing layers information in a format x, y(j1, j2, j3, . . . jn), wherein "x" and "y" are the location of each point according to the common axis, "j" is the appearance of a material or any other ingredient—truth or false—and the "j" index "n" is an identification of a layer. The variable "j" can be a character variable that represents a kind of material or any other ingredient and an appearance of the material or the non-appearance of the material or the ingredient.

By another aspect of the present invention, it is provided the method for storing and displaying a layers' information, further includes:
  decoding each element of the three-dimensions matrix and storing layer's information, wherein each element has a specific code.

By another aspect of the present invention, it is provided the method for storing and displaying a layers' information, further includes:
  displaying the three-dimensions matrix as an image, wherein the image is arranged according to the variables "x" and "y" and wherein each combination of the variables "z, j" of a specific "x" and "y" has a specific and different color.

By another aspect of the present invention, it is provided the method for storing and displaying a layers' information, wherein each element of the three-dimensions matrix has an additional variable representing a level of interest of the represented point, the additional variable could be determined manually or be determined according to predetermined criteria. Moreover, the additional variable can be used to mark interesting regions when the three-dimensions matrix is displayed.

The provided method can use layers' CAD\CAM instead of layer-images and the variable "j" can represent a non-appearance of a material or an appearance of a material and an ingredient and the kind of the material or the ingredient according to a layer's information.

By yet another aspect of the present invention, CAD\CAM of PCB layers are used and the layer information can be PCB layers CAD\CAM information.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the figures.

DETAILED DESCRIPTION

Figure 1:
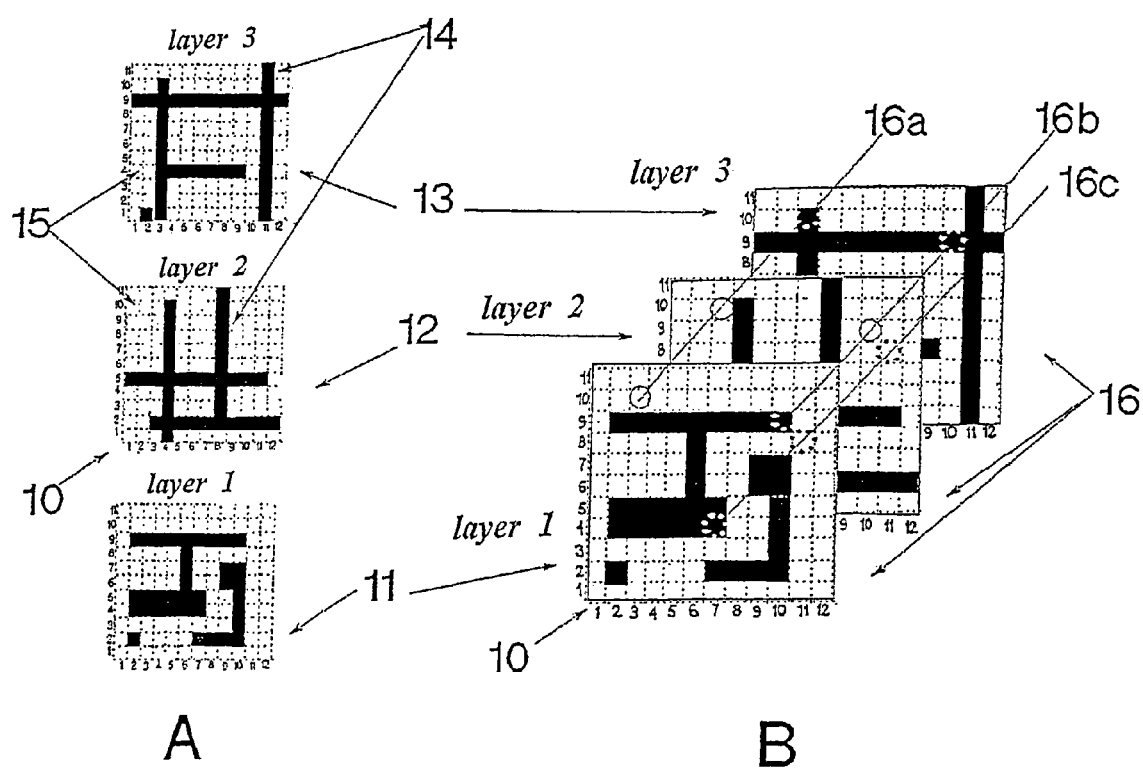
FIG. 1 illustrates a usage of the method, according to the present invention.

The present invention is a method for storing and displaying a layers' information of a layer-made object.

According to the present invention each layer of a product is represented as a two-dimensions matrix and whole matrixes combined together into a three-dimensions matrix. Each element of the three-dimensions matrix can be stored and displayed, either as a function, as a code or as a color code.

The principles and operation of the method according to the present invention may be better understood with reference to the drawing and the accompanying description.

Referring now to the drawing, FIG. 1 illustrates a usage of the method, according to the present invention. Side A of the figure illustrates three layers of PCB-alike product. To produce this product attaching together three layers, layer-1 11, layer-2 12 and layer-3 13. Each layer made of a plain base wherein some areas are 14 covered with material and other areas 15 are not covered.

An image or CAD of each layer is aligned on a common axis 10, having a two-dimensions matrix of each layer. Each point on the layer can be defined according to the common axis 10 with the indication of the appearance or non-appearance of material in the defined point. For example— in layer-1 11—the element 2,2(1) means that the point coordinated by x=2 and y=2 on the common axis 10 the appearance of material is truth (1).

In side B of the figure, the three two-dimensions matrixes are collected into a three-dimensions matrix 16 with same common axis 10. When the product is assembled, only layer-1 11 can be viewed, but information of all layers can be stored and displayed. For example, a point 16a is coordinated by 10,3 (x=10, y=3) this coordination is false (0) in layer-1 11, false (0) in layer-2 12 and truth (1) in layer-3 13. This point can be represented in several ways: 10,3(0,0,1), which means that in the coordination 10,3 layer-1 is false— layer-2 is false and layer-3 is truth, or 10,3(a) when "a" represents the combination 0, 0, 1 or $10,3(0,0,1_n)$ when the index "n" represents the kind of material in layer-3.

In the same way, point 16b is 9,10(1,0,1), the point 16c is 4,7(1,0,0) and in the same way the entire point of the product can be represented.

Figure 2:
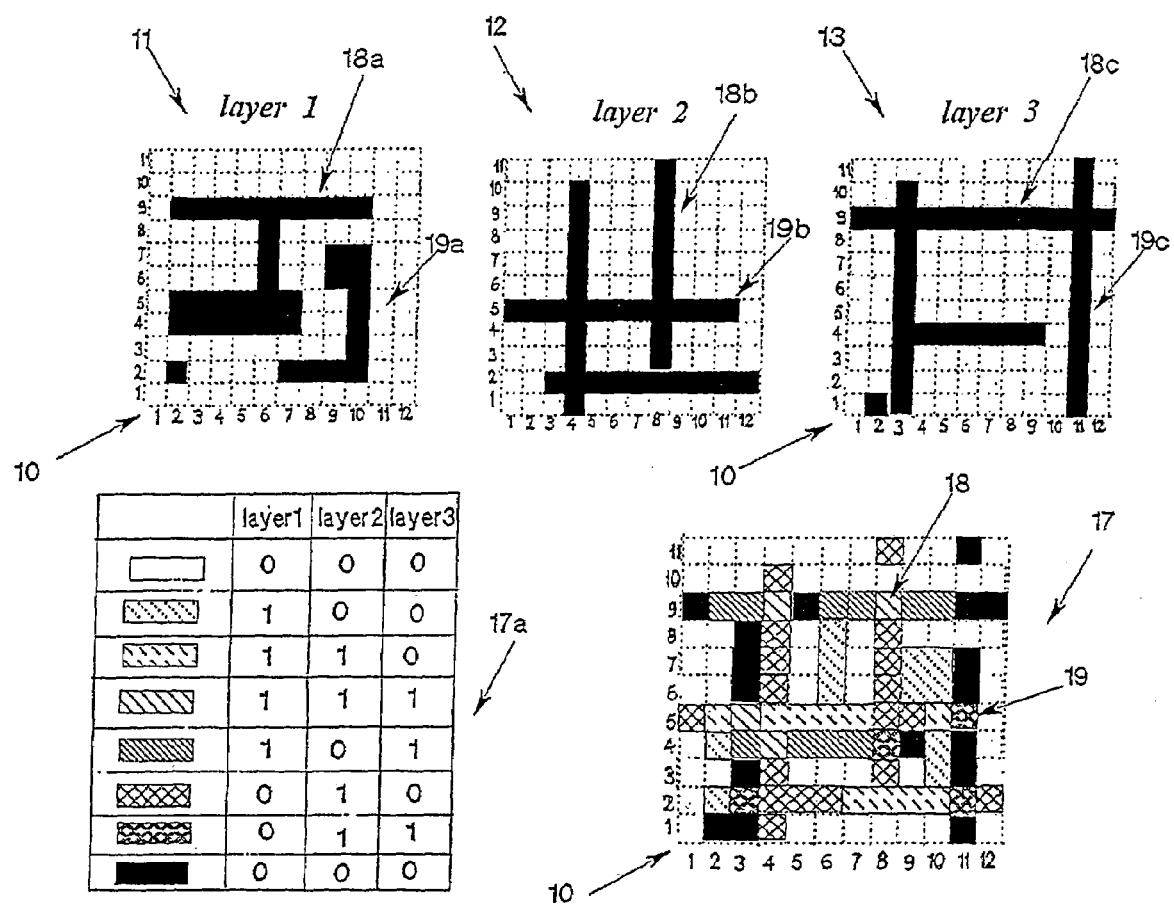
FIG. 2 illustrates a color display of a three layers object.

FIG. 2 illustrates a color display of a three layers object. Only the top layer of the PCB-alike product can be viewed, but a color image 17 represents the information of the three layers in a single image.

The product is made of three layers, layer-1 11, layer-2 12 and layer-3 13. Aligning the images or the CAD of each layer to a common axis 10. Referring the layer as a three-dimensions matrix as described in FIG. 1 and representing each combination of material appearance by a color code. Displaying the entire points of the product as a color image 17 aligned on the common axis 10 wherein each image point location is in correspondence with the product's points and wherein each combination of material appearance represented by color code according to a color table 17a. For example, the point 18 coordinated 9,8 on the common axis 10 is in a color that represents (1,1,1), which means that the appearance of material in this point is truth for layer-1 18a, truth for layer-2 18b and truth for layer-3 18c. Other example, the point 19 coordinated 5,11 is in a color that represents (0,1,1), which means that the appearance of material in this point is false for layer-1 19a, truth for layer-2 19b and truth for layer-3 19c.

As used herein in the specification and in the claims section that follows, the term "layer" and the like refer to the a physical layer made of material or a process layer, which is a process that is done on one of the physical layers in the production sequence.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

We claim:

1. A method for displaying a layers' information of a layer-made object, comprising:
    a) forming a layer-image of each layer of said object layers, wherein said layer image is a perpendicular view image of said layer;
    b) aligning each of said layer-images in a common two-dimensions axis, wherein said layer-image location in said common axis is in correspondence with the location of said layer in said object when is assembled;
    c) forming two dimension matrixes, a two dimension matrix for each layer-image, wherein each matrix element has three variables (x,y,j)—when "x" and "y" are representing a point location on said layer-image according to said common axis and "j" represents an appearance of material view in said point of said layer-image;
    d) adding said two dimension matrixes into a three-dimensions matrix, wherein each matrix element has four variables (x,y,z,j)—when "x" and "y" are representing said point location, "z" represents layer identification and "j" represents said appearance of material; and
    h) displaying said three-dimensions matrix as an image, wherein said image is arranged according to the variables "x" and "y" and wherein each combination of the variables "z,j" of a specific "x" and "y" has a specific and different color.

2. The method of claim 1, further includes:
    e) representing each element of said three-dimensions matrix as a function (x, y, j [i]), wherein Jxy=F (x, y) represents information at location x,y in said common axis, where Jxy=(jxy1, jxy2, jxy3 ... jxyn), which is an "n" number length vector wherein "n" is the number of said layers and jxy[i] is a data according to the i-th layer out of "n" layers at said location (x,y).

3. The method of claim 1, further includes:
    f) storing layers information in a format $x,y(j_1,j_2, j_3, \ldots j_n)$, wherein "x" and "y" are the location of each point according to said common axis, "j" is the appearance of a material or any other ingredient—truth or false—and the "j" index "n" is an identification of a layer.

4. The method of claim 3, wherein "j" is a character variable that represents a kind of material or ingredient and an appearance of said material or said ingredient or the non-appearance of said material or said ingredient.

5. The method of claim 1, further includes:
    g) decoding each element of said three-dimensions matrix and storing layer's information, wherein each element has a specific code.

6. The method of claim 1, wherein each element of said three-dimensions matrix has an additional variable representing a level of interest of the represented point, said additional variable could be determined manually or be determined according to predetermined criteria.

7. The method of claim 6, wherein said additional variable is used to mark interesting regions when said three-dimensions matrix is displayed.

8. The method of claim 1, wherein layers' CAD\CAM are used instead of said layer-images.

9. The method of claim 8, wherein said variable "j" represents a non-appearance of a material or an appearance of a material or any other ingredient and a kind of said material or said ingredient according to a layer's information.

10. The method of claim 8, wherein said CAD\CAM are PCB layers CAD\CAM.

11. The method of claim 9, wherein said layer information is a PCB layers CAD\CAM information.

12. The method of claim 1, wherein said layer is a physical layer or a process layer, which is performed on a physical layer during the production sequence.

* * * * *